(12) United States Patent
Mummadi et al.

(10) Patent No.: US 10,824,122 B2
(45) Date of Patent: *Nov. 3, 2020

(54) METHOD AND DEVICE FOR IMPROVING THE ROBUSTNESS WITH RESPECT TO "ADVERSARIAL EXAMPLES"

(71) Applicant: Robert Bosch GmbH, Stuttgart (DE)

(72) Inventors: Chaithanya Kumar Mummadi, Heimsheim (DE); Jan Hendrik Metzen, Boeblingen (DE); Volker Fischer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,478

(22) Filed: Apr. 16, 2019

(65) Prior Publication Data

US 2019/0243317 A1    Aug. 8, 2019

Related U.S. Application Data

(63) Continuation of application No. 15/885,131, filed on Jan. 31, 2018, now Pat. No. 10,331,091.

(30) Foreign Application Priority Data

Apr. 21, 2017 (DE) .................... 20 2017 102 381 U (51) Int. Cl.
*G05B 13/02* (2006.01)
*G06N 20/00* (2019.01)
(Continued)

(52) U.S. Cl.
CPC ......... *G05B 13/027* (2013.01); *G05B 13/044* (2013.01); *G06F 17/18* (2013.01);
(Continued)

(58) Field of Classification Search
CPC ......... G05B 13/027; G06N 20/00; G06T 7/10
See application file for complete search history.

(56) References Cited

U.S. PATENT DOCUMENTS

2015/0049634 A1*  2/2015  Levchuk ............... G06Q 50/01
                                                         370/254
2016/0350930 A1* 12/2016  Lin ..................... G06K 9/4628
(Continued)

FOREIGN PATENT DOCUMENTS

DE       102005050577 A1    5/2007

OTHER PUBLICATIONS

Fischer et al., "Adversarial Examples for Semantic Image Segmentation", Mar. 3, 2017, https://arxiv.org/abs/1703.01101.

*Primary Examiner* — Marc Anthony Armand
(74) *Attorney, Agent, or Firm* — Norton Rose Fulbright US LLP; Gerard Messina (57) ABSTRACT

A method for generating a manipulated data signal for misleading a first machine learning system, which is designed to ascertain a semantic segmentation of a received one-dimensional or multi-dimensional data signal, the method having the following steps: a) ascertaining a desired semantic segmentation of the manipulated data signal; and b) generating the manipulated signal as a function of the received data signal and the ascertained desired semantic segmentation as well as an estimated semantic segmentation of the manipulated data signal.

13 Claims, 6 Drawing Sheets

(51) Int. Cl.
*G06N 3/08* (2006.01)
*G06T 7/10* (2017.01)
*G05B 13/04* (2006.01)
*G06F 17/18* (2006.01)
*G06N 3/04* (2006.01)

(52) U.S. Cl.
CPC .......... *G06N 3/0454* (2013.01); *G06N 3/084* (2013.01); *G06N 20/00* (2019.01); *G06T 7/10* (2017.01)

(56) References Cited

U.S. PATENT DOCUMENTS

| | | | |
|---|---|---|---|
| 2017/0024877 A1* | 1/2017 | Versace | G06K 9/00664 |
| 2018/0018393 A1 | 1/2018 | Latapie et al. | |
| 2018/0159879 A1 | 6/2018 | Mestha et al. | |

\* cited by examiner

METHOD AND DEVICE FOR IMPROVING THE ROBUSTNESS WITH RESPECT TO "ADVERSARIAL EXAMPLES"

CROSS REFERENCE

The present application is a continuation of, and claims the benefit under 35 U.S.C. § 120 to, U.S. patent application Ser. No. 15/885,131 filed on Jan. 31, 2018, which is expressly incorporated herein by reference in its entirety. The present application also claims the benefit under 35 U.S.C. § 119 of German Patent Application No. DE 202017102381.8 filed on Apr. 21, 2017, which is expressly incorporated herein by reference in its entirety.

FIELD

The present invention relates to a method for generating a manipulated data signal, to a method for assessing a robustness of an actuator-control system, and to a method for training an actuator-control system; it also relates to devices which are set up for executing these methods.

BACKGROUND INFORMATION

A neural network for a control unit is described in German Patent Application No. DE 10 2005 050 577 A1. The neural network 1 for a control unit is tested. The neural network has a plurality of first neurons N1, N2, . . . , Nn in a first layer, and a second neuron M in a second layer following the first layer. Each test-signal combination is selected from a predefined plurality of test-signal combinations. Each test-signal combination assigns a test-input-signal vector ut1, ut2, . . . , utk to each first neuron N1, N2, . . . , Nn, which is either a zero signal or saturates the associated first neuron N1, N2, . . . , Nn in such a way that the first neuron N1, N2, . . . , Nn outputs a lower saturation value $\varphi$min, or saturates associated first neuron N1, N2, . . . , Nn in such a way that first neuron N1, N2, . . . , Nn outputs an upper saturation value. The test-signal combination is applied to first neurons N1, N2, . . . , Nn, and output signal p of second neuron M is acquired. A partial test signal is stored when output signal p is greater than a predefined threshold value. A positive total test signal is output after each of the test-signal combinations has been applied and when no partial test signal is stored for the predefined plurality of test-signal combinations.

SUMMARY

The present method makes semantic segmentations ascertained with the aid of machine learning methods particularly robust with respect to what is known as adversarial examples. Adversarial examples are slightly manipulated input data (which in the case of image data are so similar to the non-manipulated input data that they are virtually indistinguishable by human experts), which may lead to a significant change in the ascertained semantic segmentation. For example, it would be possible that a malicious attacker uses such an adversarial example in order to mislead an autonomous robot, for instance by suppressing a semantic segmentation that marks an actually existing river as "river"; this could result in a risk to the autonomous robot that carries out its route planning on the basis of this semantic segmentation. The effectiveness of such attacks is able to be reduced with the aid of the method according to the present invention.

Advantageous further developments are described herein.

In a first aspect, the present invention relates to a method for generating a manipulated data signal for misleading a first machine learning system that is set up to ascertain a semantic segmentation of a received one-dimensional or multi-dimensional data signal, the present method including the following steps:

a) Ascertaining the desired semantic segmentation of the manipulated data signal; and b) Generating the manipulated data signal as a function of the received data signal and the ascertained desired semantic segmentation as well as an estimated semantic segmentation of the manipulated data signal.

A semantic segmentation of the data signal normally means that a semantic value from a predefined selection of possible semantic values is allocated to sections of the data signal.

If the semantic segmentation of these adversarial examples is ascertained with the aid of the first machine learning system, then, depending on the desired semantic segmentation, a clear difference results in comparison with the corresponding semantic segmentation of the respective unbiased data signal.

The estimated semantic segmentation is able to be ascertained by the first machine learning system or by a simulation of the first machine learning system.

The semantic segmentation is preferably performed in a "pixelwise" manner, i.e., the semantic segmentation has the same dimensionality as the one-dimensional or multi-dimensional data signal and preferably allocates a semantic value to each data point in the one-dimensional or multi-dimensional data signal.

Generating data signals that are manipulated in this manner in particular makes it possible to improve the robustness of the first machine learning system for the semantic segmentation with respect to potential attackers and to assess the robustness in a reliable manner.

In one advantageous further development of the present invention, it may be provided that the desired semantic segmentation is selected as a function of an estimated semantic segmentation of the received data signal.

The desired semantic segmentations are thereby able to be generated with especially little effort since no actual, "true" semantic segmentation of the data signals of the training dataset is required.

It may additionally be provided in accordance with the present invention that the desired semantic values of the desired semantic segmentation are selected as a function of whether the estimated semantic values of the estimated semantic segmentation assume a predefinable value.

This allows for a particularly effective simulation of attacks that are intent on suppressing the information of data points whose semantic value has a predefinable value.

In this context it may be provided to use a substitute value for the desired semantic values at a position at which the estimated semantic values assume the predefinable value. The substitute value is a value that differs from the estimated semantic value.

The substitute value is advantageously the particular estimated semantic value at a substitute position close to said position. For instance, the substitute position may be the nearest position whose estimated semantic value differs from the predefinable value.

According to another aspect of the present invention, it may be the case that the desired semantic values are selected so as to equal the estimated semantic values if the estimated semantic values do not assume the predefinable value. In other words, at the positions, and in particular precisely at the positions at which the estimated semantic values do not assume the predefinable value, the desired semantic values are selected so as to equal the estimated semantic values.

Each one of the two previously mentioned measures makes it possible to simulate an attacker who lets the suppressed data points transition into the semantic segmentation of the background in a particularly harmonious manner, and thus carries out an especially well-directed attack.

This may be accomplished in that the generation of the manipulated data signal is performed using a function value of a cost function of the first machine learning system that is assumed by said cost function among the data signals manipulated in this manner and for the desired semantic segmentations. In other words, in the usual manner, the cost function has as arguments the output value (the ascertained semantic segmentation) of the first machine learning system that was ascertained by the first machine learning system as a function of its input signal (the data signal). Furthermore, in the usual manner, the cost function has a desired semantic segmentation (i.e. desired semantic values) as a further argument. It is now provided to substitute the manipulated data signal for the data signal as the input signal.

More specifically, the manipulated data signal may be selected from a set of allowed data signals such that it numerically minimizes the cost function among the data signals manipulated in this manner for the desired semantic values. For example, such a numerical minimization may be carried out by an iterative method, the iterative method being terminated once a predefinable abort criterion (e.g., after a predefinable number of iteration steps) has been reached. It is clear to one skilled in the art that the theoretically achievable minimum will usually be reached merely approximately rather than precisely.

In one flexible further development, it may be the case that the cost function encompasses two components, one of which characterizes the share of the particular positions in the cost function whose estimated semantic values assume the predefinable value, and the other characterizing the share of the particular positions in the cost function whose estimated semantic values do not assume the predefinable value, these two components being weighted relative to each other in a predefinable manner.

This makes it particularly easy to flexibly simulate not only attacks aimed at suppressing information of data points whose semantic segmentation has a predefinable value in the most efficient manner possible (this may be accomplished by high weighting of the first component) but also to simulate attacks aimed at disturbing the semantic background as little as possible in order to be particularly difficult to detect in this manner (this may be accomplished by high weighting of the second component).

In a further aspect, the present invention is directed to such data signals that include a sequence of time slices, e.g., video signals. It may now be provided that the desired semantic segmentation of the data signals of a predefinable time slice be selected as a function of an estimated semantic segmentation of the data signal of a further time slice, the further time slice temporally preceding the predefinable time slice. This may advantageously be utilized to simulate an attacker who is intent on hiding a suspicious activity, e.g., from video monitoring using a static camera.

This may be accomplished in a particularly uncomplicated manner through a fixed selection of the further time slice and by selecting the desired semantic segmentation of the data signal for each predefinable time slice that temporally follows the further time slice so that it equals the estimated semantic segmentation of the data signal of the further time slice.

In an additional refining aspect, it is provided to use the present invention for assessing a robustness of an actuator-control system for the control of an actuator, which includes a first machine learning system designed to ascertain a semantic segmentation of a received one-dimensional or multi-dimensional data signal that characterizes a status of an actuator system including the actuator and an environment of the actuator. The actuator-control system is designed to ascertain a control signal as a function of the ascertained semantic segmentation and to control the actuator as a function of the ascertained control signal.

It may then be provided that a manipulated data signal is ascertained as a function of the data signal using one of the aforementioned methods, and that a second control signal is ascertained as a function of an ascertained second semantic segmentation, which is ascertained with the aid of the first machine learning system by exchanging the data signal for the manipulated data signal (i.e. instead of the data signal, the manipulated data signal is supplied to the first machine learning system). A decision is then made as a function of the control signal and also as a function of the second control signal as to whether or not the actuator-control system is robust.

Such a method may particularly also run during the operation of the actuator-control system in order to assess whether the actuator-control system would exhibit a robust behavior in response to a potential attack on a continuous basis or at regular time intervals.

On this basis, an operation of an actuator-control system for controlling an actuator is able to be provided, and it is assessed, as previously described, whether or not the actuator-control system is robust, with the actuator-control system controlling the actuator as a function of the assessment. In particular, the actuator-control system is able to be transferred into a safe mode in the event that the assessment indicates that the actuator-control system is not robust.

According to one still further aspect, the present invention relates to the training of an actuator-control system, which in particular includes a first machine learning system, which is designed to ascertain a semantic segmentation of a received one-dimensional or multi-dimensional data signal that characterizes the status of an agent system, in particular an actuator system including an actuator and an environment of the actuator. Furthermore, the actuator-control system is designed to ascertain an output value of a second machine-learning system, which characterizes a probability that the semantic segmentation is false, and in particular, that the data signal is an adversarial example. A control of the actuator may take place as a function of the ascertained semantic segmentation, and the control of the actuator may take place according to a fault-defense reaction if a decision was made that a fault is present. This training method includes the following steps:

a) Selecting a subset of data signals from a training set for the second machine learning system that includes data signals;

b) Deciding whether or not the data signals of this subset are to be manipulated;

c) If a decision was made to manipulate the data signals, ascertaining manipulated data signals as a function of the respective data signals with the aid of one of the aforementioned methods, and substituting the respective ascertained manipulated data signals for the data signals;

d) Setting a desired output value to the value of a predefinable first numerical value when the data signals will not be manipulated, or setting the desired output value to a second predefinable numerical value that differs from the first numerical value when the data signals are manipulated; and e) Training the parameters of the second machine learning system using the (possibly manipulated) subset of observed values and associated desired output values.

By adapting the manipulation of the data signals to the respective data signals, this training method makes it possible to avoid an over-adaption of the second machine learning system in a particularly satisfactory manner.

According to one still further aspect, the present invention relates to devices that include a machine-readable memory medium and a computer. The machine-readable memory medium stores a computer program which includes instructions that induce the device to carry out all of the steps of one of the aforementioned methods when the computer program is running on the computer.

Specific embodiments of the present invention are described in greater detail below with reference to the figures.

DETAILED DESCRIPTION OF EXAMPLE EMBODIMENTS

Figure 1:
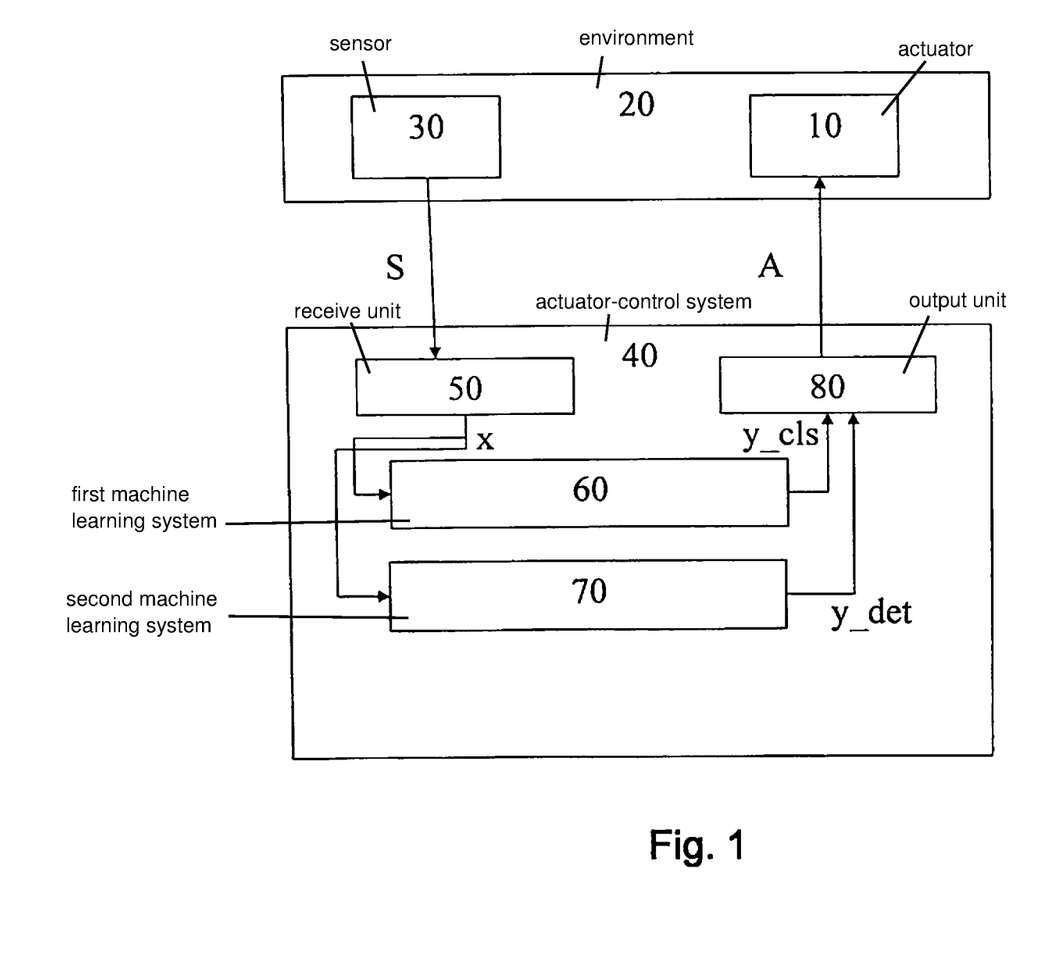
FIG. 1 shows schematically, an interaction between the actuator and the actuator-control system.

FIG. 1 shows an actuator 10 in its environment 20 in an interaction with an actuator-control system 40. Hereinafter, actuator 10 and environment 20 are jointly also referred to as an actuator system. A status of the actuator system is detected by a sensor 30, which may also be provided in the form of a plurality of sensors. An output signal S of sensor 30 is transmitted to actuator-control system 40. Actuator-control system 40 ascertains a control signal A therefrom, which is received by actuator 10.

Actuator 10, for instance, may be a (partially) autonomous robot, e.g., a (partially) autonomous motor vehicle. Sensor 30, for example, may involve one or more video sensor(s) and/or one or more radar sensor(s), and/or one or more ultrasonic sensor(s), and/or one or more position sensor(s) (such as GPS).

Alternatively or additionally, sensor 30 may also include an information system which ascertains an item of information pertaining to a status of the actuator system such as a weather-information system, which determines a current or future status of the weather in environment 20.

In another exemplary embodiment, actuator 10 may be a production robot, and sensor 30 may then involve an optical sensor, for example, which detects characteristics of manufacturing products of the production robot.

In another exemplary embodiment, actuator 10 may be a release system, which is designed either to enable or not to enable the activity of a device. Sensor 30, for instance, may be an optical sensor (e.g., for the detection of image or video data), which is designed to detect a face. Actuator 10 ascertains a release signal as a function of control signal A, which may be used to enable the device as a function of the value of the release signal. For instance, the device may be a physical or logical access control. Depending on the value of control signal A, the access control may then grant or refuse access.

Actuator-control system 40 receives output signal S from the sensor in an optional receive unit 50, which converts output signal S into a data signal x (alternatively, it is also possible to directly accept output signal S as data signal x). Data signal x, for instance, may be a segment or further processing of output signal S. Output signal x is forwarded to a first machine learning system 60 such as a neural network.

In one preferred exemplary embodiment, which will be described in the following text, data signal x is a two-dimensional image signal whose pixels are characterized by one or three numerical values. However, data signal x may also be some other one-dimensional or multi-dimensional data signal.

First machine learning system 60 uses image signal x in order to ascertain an associated semantic segmentation y_cls. In the process, a semantic value is allocated to each section of image signal x. A pixelwise segmentation is performed in the exemplary embodiment, i.e. semantic segmentation y_cls has the same dimension as data signal x.

Semantic segmentation y_cls may characterize probabilities that this pixel will be classified as belonging to a particular semantic class (from a plurality of semantic classes). For each pixel, for example, semantic segmentation y_cls may be a vector-value quantity, which indicates for each of the semantic classes, with the aid of an allocated number in the value interval [0; 1], the likelihood that this pixel should be allocated to the respective semantic class. Semantic segmentation y_cls may also be a scalar quantity for each pixel, e.g. an identifier of the particular semantic class whose above-described probability assumes the greatest value.

In addition, actuator-control system 40 includes a second machine learning system 70, e.g., a neural network. Second machine learning system 70 also receives image signal x and ascertains an output value y_det therefrom, which, for example, may be a number in the value range [0; 1] and may characterize a probability that observation value B was manipulated in such a way that semantic segmentation y_cls does not correctly characterize image data x.

This is accomplished in the exemplary embodiment by setting up second machine learning systems 70 in such a way that output value y_det characterizes a likelihood that image signal x is an adversarial example.

Semantic segmentation y_cls and output value y_det are transmitted to an output unit 80, which ascertains control signal A therefrom. For example, it is possible that the output unit first checks whether output value y_det is smaller than a predefinable threshold value. If this is the case, control signal A is ascertained as a function of semantic segmentation y_cls. This is the normal case. On the other hand, if it is ascertained that output value y_det is not smaller than the predefinable threshold value, then control signal A may be developed in such a way that it transfers actuator A into a safe mode.

In one specific embodiment, actuator-control system 40 includes a computer as well as a machine-readable memory medium (not shown) which stores a computer program that, when executed by the computer, induces the computer to execute the described functionalities of actuator-control system 40. First machine learning system 60 and second machine learning system 70 may in particular be implemented as separate or shared computer programs in this instance.

Figure 2:
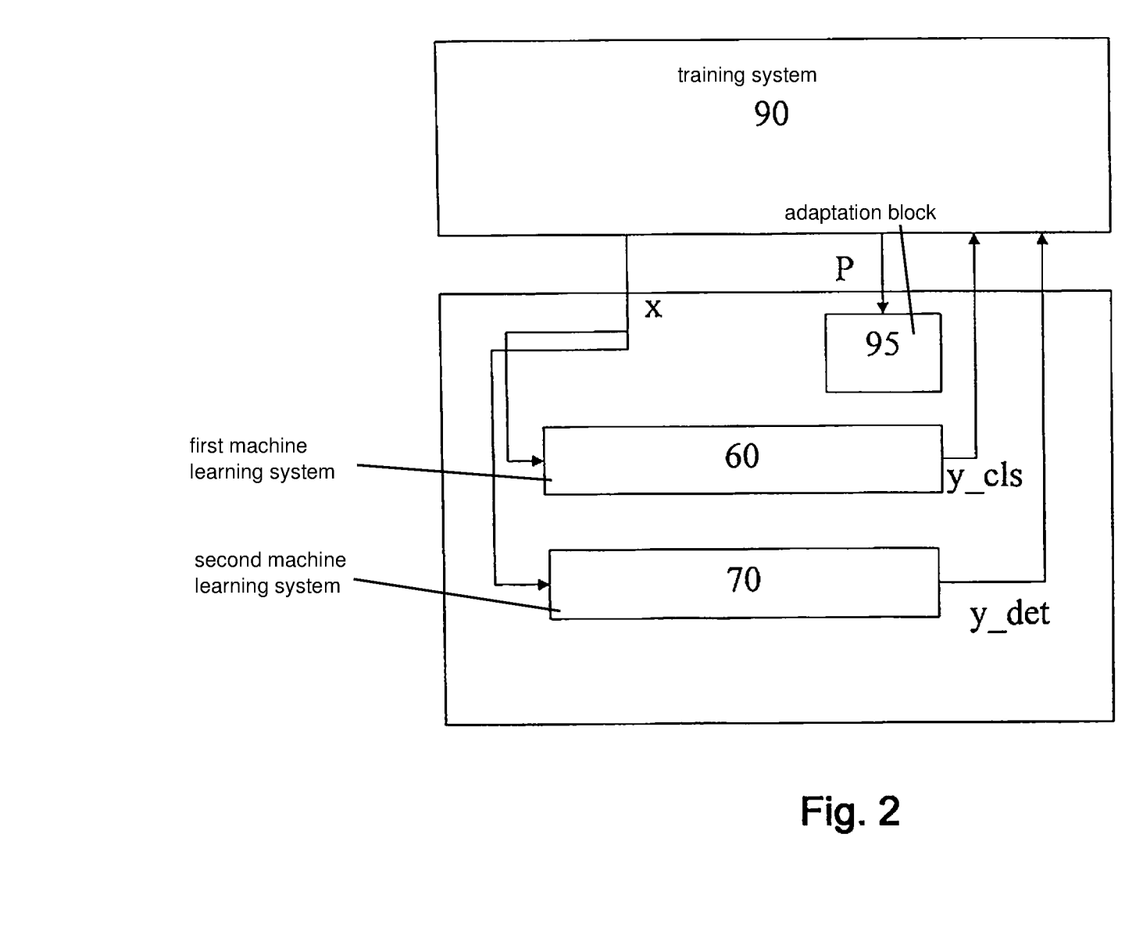
FIG. 2 shows schematically, an interaction between the training system and the actuator-control system.

FIG. 2 illustrates the interaction between a training system 90, first machine learning system 60, and second machine learning system 70. Training system 90 has a training dataset that includes image signals x. One or more image signal(s) x is/are selected from the training dataset and made available to first machine learning system 60. This may involve individual image signals x, i.e. those that are also forwarded to first machine learning system 60 when actuator-control system 40 is interacting with actuator 10 and sensor 30. However, it may also involve a batch, i.e. a plurality of such image data x.

Using the image data x it has received, first machine learning system 60 ascertains a respective semantic segmentation y_cls. In the same way, second machine learning system 70 ascertains an output value y_det, analogous to FIG. 1. Semantic segmentation y_cls and output value y_det are once again forwarded to training system 90. Training system 90 ascertains a parameter-adaptation signal P therefrom, which encodes which particular parameters of second machine learning system 70 are to change their values and in which way. For example, this desired adaptation is performed by specifying desired values for output value y_det and back propagation. Training system 90 forwards parameter-adaptation signal P to an adaptation block 95 for this purpose, which appropriately adapts the parameters in first machine learning system 60 and in second machine learning system 70. In this case it is possible to adapt only the parameters of first machine learning system 60 or only the parameters of second machine learning system 70.

In one specific embodiment, training system 90 includes a computer and a machine-readable memory medium (not shown), which stores a computer program that, when running on a computer, induces the computer to execute the described functionalities of learning system 90.

Figure 3:
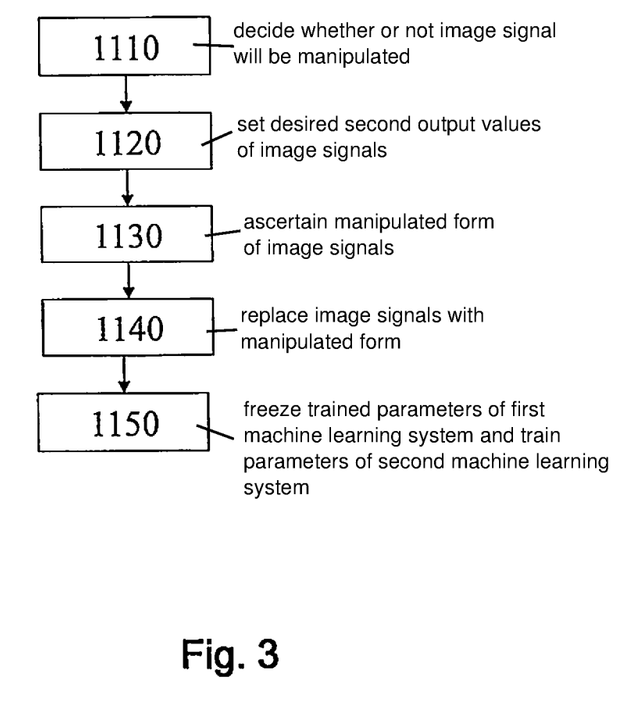
FIG. 3 shows a specific embodiment of a training method.

FIG. 3 shows in the form of a flow diagram a specific embodiment of a method for training the parameters of second machine learning system 70 with the aid of training system 90.

In this instance, the parameters of first machine learning system 60 are frozen, and the parameters of second machine learning system 70 are trained.

To begin with (1110), for each image signal x that was forwarded to first machine learning system 60 in the first training phase, a decision is made as to whether or not it will be manipulated. For instance, this may be carried out randomly using a predefinable probability, e.g., 50%.

Next (1120), the desired second output values y_det of image signals x that are to be manipulated are set to the value "1" and otherwise they are set to the value "0".

Figure 4:
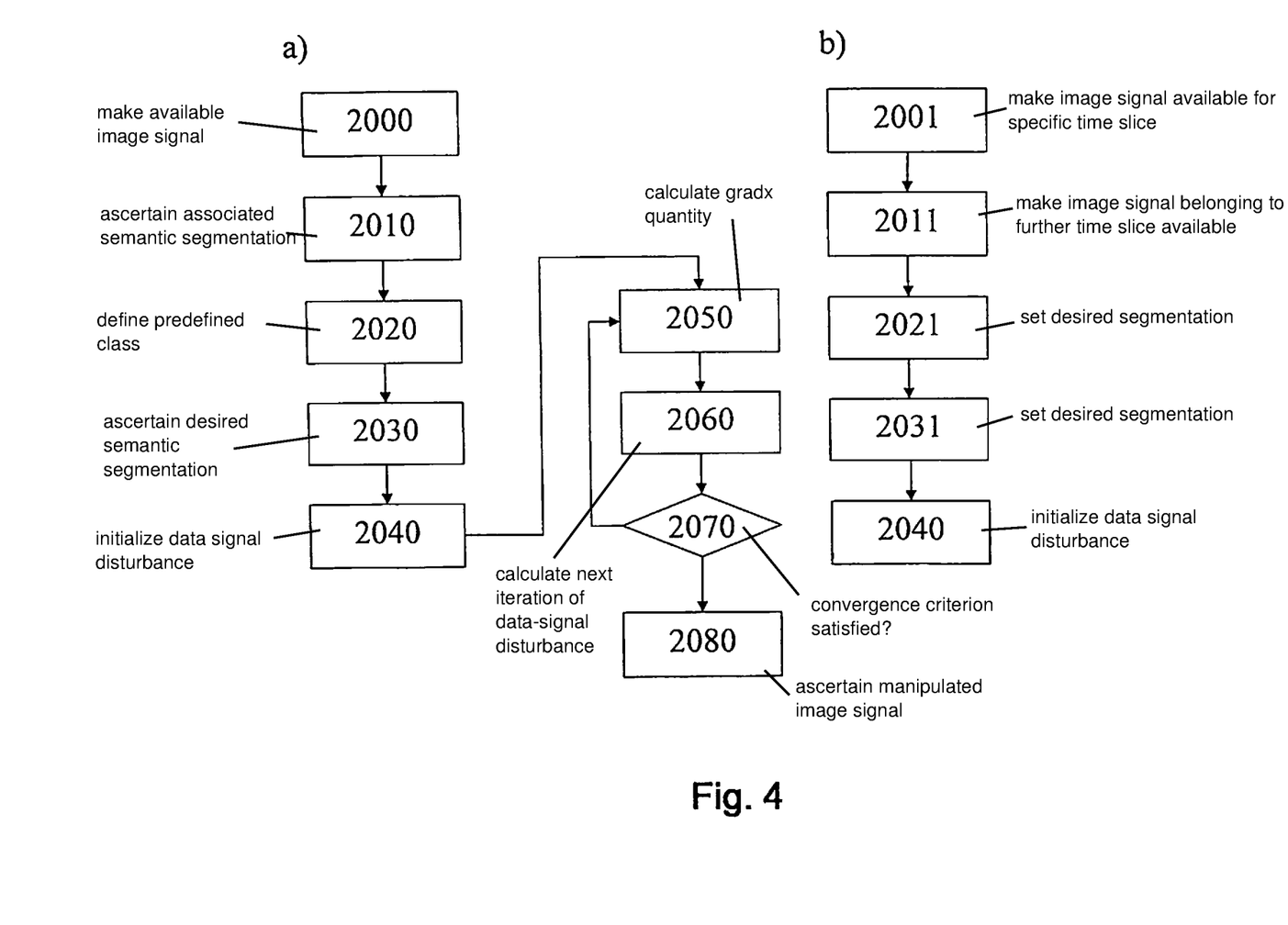
FIG. 4 shows specific embodiments of the present method for ascertaining the manipulated data signal.

In the following step 1130, the respective manipulated form $x^{adv}$ is ascertained for image signals x that are to be manipulated. The method for generating manipulated image signals $x^{adv}$ is illustrated in FIG. 4.

Then (1140), image signals x that are to be manipulated are replaced by their ascertained manipulated form $x^{adv}$.

In the next step 1150, the trained parameters of first machine learning system 60 are frozen, and the parameters of second machine learning system 70 are trained.

The training of the parameters is performed with the aid of described cost function $J_{det}$ of second machine learning system 70 and back propagation.

This concludes second phase 1100.

FIG. 4 shows methods for generating manipulated image signals $x^{adv}$, in the form of flow diagrams. FIG. 4a illustrates a first method of this type.

In a first step 2000, image signal x for which manipulated image signal $x^{adv}$ is to be generated is made available.

This is followed by step 2010, in which the associated semantic segmentation y_cls is ascertained with the aid of first machine learning system 60 (an equivalent system may be used instead of first machine learning system 60). Hereinafter, this semantic segmentation y_cls is also denoted by the symbol $f_\theta(x)$, with $\theta$ denoting the parameters of the first machine learning system 60 and f denoting the mapping rule that machine learning system 60 executes. For each point (i,j) a semantic value $y^{pred}_{ij}=f_\theta(x)_{ij}$ is therefore estimated. The associated estimated semantic segmentation is also denoted by symbol $y^{pred}$.

In step 2020, a predefined class o is defined, i.e. o being a predefinable value, which corresponds to one of the permissible semantic values. Now, a foreground set $I_o$ is defined as the set of all the points (i,j) of image signal x whose associated estimated semantic values $y^{pred}_{ij}$ assume said predefinable value $_o$. Furthermore, a background set $I_{bg}$ is ascertained, which includes all of the particular points whose associated estimated semantic values $y^{pred}_{i,j}$ do not assume this predefinable value o. The combination of foreground set $I_o$ and background set $I_{bg}$ is also referred to as total set I.

In step 2030, a desired semantic segmentation $y^{target}$, whose associated semantic values $y^{target}_{ij}$ is [sic; are] selected so as to equal the corresponding estimated semantic value $y^{target}_{ij}$ for each point (i,j) contained in background set $I_{bg}$, is ascertained for image signal x. In addition, a substitute value is ascertained for each point (i,j) contained in foreground set $I_o$. For this purpose, a substitute position (i',j') is first ascertained in image signal x, i.e. with the aid of $$i', j' = \operatorname*{argmin}_{i',j' \in I_{bg}} (i'-i)^2 + (j'-j)^2.$$

The semantic value at this substitute location (i,j') is then selected as the substitute value. It is selected for the point (i,j) in the desired semantic segmentation $y^{target}$, i.e. $y^{target}_{ij}=y^{pred}_{i'j'}$.

In one alternative specific development, the method runs through alternative steps 2001, 2011, 2021 and 2031 rather than steps 2000, 2010, 2020 and 2030. This alternative specific embodiment may be used in the case of image signals x that are made up of a plurality of time slices t, such as video signals, i.e. for each time slice t, image signal x includes an image signal $x_t$ that is allocated to this time slice.

The alternative specific embodiment begins in step 2001, in which image signal $x_t$ to be manipulated is made available for a specific time slice t.

Then (2011), a further time slice t0 is predefined, and image signal $x_{t0}$ belonging to this time slice t0 is made available. The semantic segmentation $y^{pred}_{t0}$ associated with this image signal $x_{t0}$ is ascertained as $y^{pred}_{t0}=f_\theta(x_{t0})$, analogous to step 2010.

In the event that time slice t is associated with a later instant than further time slice t0, the desired semantic segmentation $y^{target}_t=y^{pred}_{t0}$ will be set in step 2021.

In the event that time slice t is not associated with an instant later than further time slice t0, the desired semantic segmentation $y^{target}_t$ will be ascertained in step 2031, analogous to steps 2000 to 2030, and instead of image signal x, image signal $x_t$ associated with examined time slice t will be utilized in the steps.

Now (2040), a data signal disturbance $\zeta^{(0)}$ with the dimension of image signal x is initialized with $\zeta^{(0)}=0$. A counter n is adjusted to the value n=0.

Next (2050), the quantity $$\text{grad}_x(\zeta^{(n)}) = \nabla_x J^{\omega}_{ss}(f_\theta(x+\zeta^{(n)}), y^{target})$$

is calculated.

Quantity $J^\omega_{ss}$ denotes a weighted cost function of first machine learning system (60) according to $$J^\omega_{ss}(f_\theta(x), y^{target}) = \frac{1}{|I|}\left\{\omega \sum_{(i,j)\in I_o} J_{cls}(f_\theta(x)_{ij}, y^{target}_{ij}) + (1-\omega)\sum_{(i,j)\in I_{bg}} J_{cls}(f_\theta(x)_{ij}, y^{target}_{ij})\right\}$$

Here, $J_{cls}$ is a cost function of first machine learning system 60, e.g. a cross entropy.

Quantity $\omega$ is a predefinable quantity able to be specified in the value range [0; 1], e.g., to the value 0.5.

Then (2060), a next iteration of data-signal disturbance $\zeta^{(n+1)}$ is calculated according to the following formula $$\zeta^{(n+1)} = \text{Clip}_\varepsilon\{\zeta^{(n)} - \alpha\ \text{sgn}(\text{grad}_x(\zeta^{(n)}))\}$$

Here, the function $\text{Clip}_\varepsilon(x)$ normalizes values of a variable x to an $\varepsilon$ sphere around the origin. The norm may be an $L^2$ norm or also an $L^\infty$ norm. $\alpha$ is specified as a predefinable value such as $\alpha=0.25$. The value of variable n is incremented by 1.

Next (2070), it is checked whether a convergence criterion is satisfied. For example, it may be checked whether n has exceeded a predefinable limit value nmax, e.g., nmax=10. If this is not the case, then it is branched back to step 2050. In the other case, manipulated image signal $x^{adv}$ is ascertained as a function of data-signal disturbance $\zeta^{(n)}$ and image signal x as $x^{adv}=x+\zeta^{(n)}$ in step 2080. This concludes this method.

Figure 5:
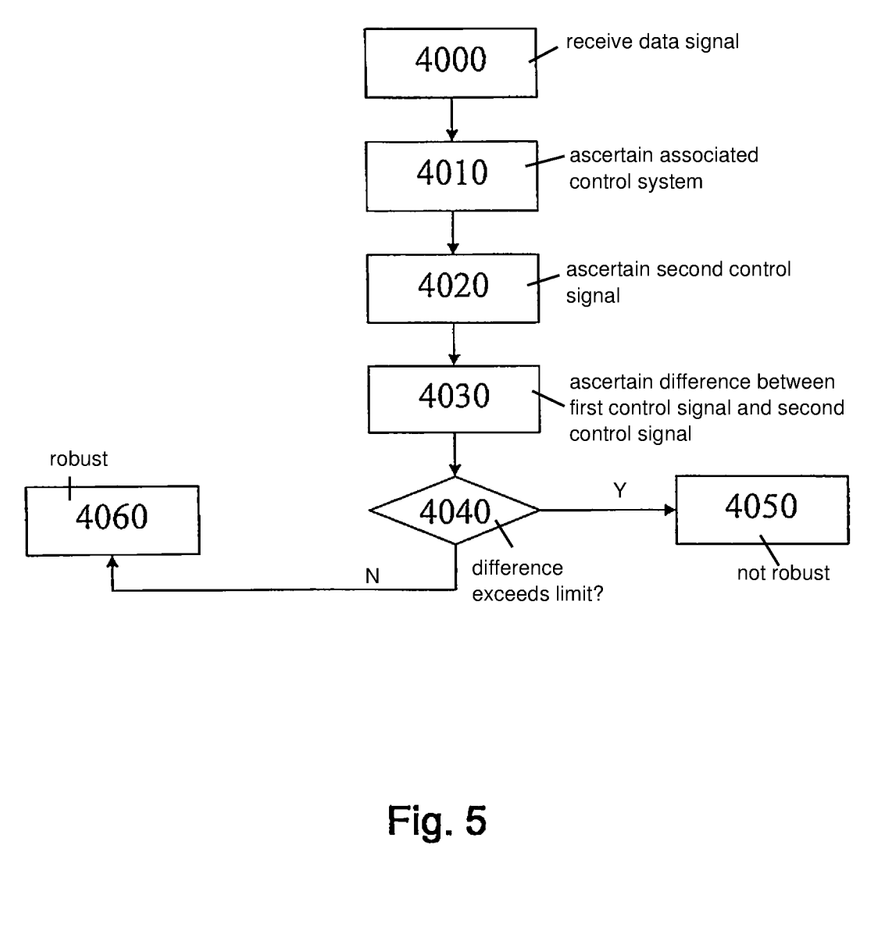
FIG. 5 shows a specific embodiment of the present method for assessing the robustness of the actuator-control system.

Using a flow diagram, FIG. 5 illustrates an exemplary embodiment of the present method for assessing the robustness of actuator-control system 40. In a first step 4000, a data signal x is received. Next (4010), actuator-control system 40 ascertains an associated control signal A therefrom for the control of actuator 10. Then (4020), using one of the methods illustrated in FIG. 4, a manipulated data signal $x^{adv}$ is ascertained from data signal x. This manipulated data signal $x^{adv}$ is also forwarded to first machine learning system 60, and a second semantic segmentation $y\_cls^{adv}$ is ascertained. Analogous to the ascertainment of control signal A, a second control signal $A^{adv}$ is determined from the ascertained second semantic segmentation $y\_cls^{adv}$. Next (4030), the difference between control signal A and second control signal $A^{adv}$ is ascertained and it is checked (4040) whether the amount of this difference exceeds a predefinable limit value. If this is the case (4050), a decision is made that actuator-control system 40 is not robust, whereas otherwise (4060), a decision is made that actuator-control system 40 is robust. This concludes the method. The present method may be implemented in the form of a computer program, be stored on the memory medium of actuator-control system 40, or be executed thereby. The computer program is also able to be stored on a generic computer, which is able to be linked to actuator-control system 40, and be executed thereby.

Figure 6:
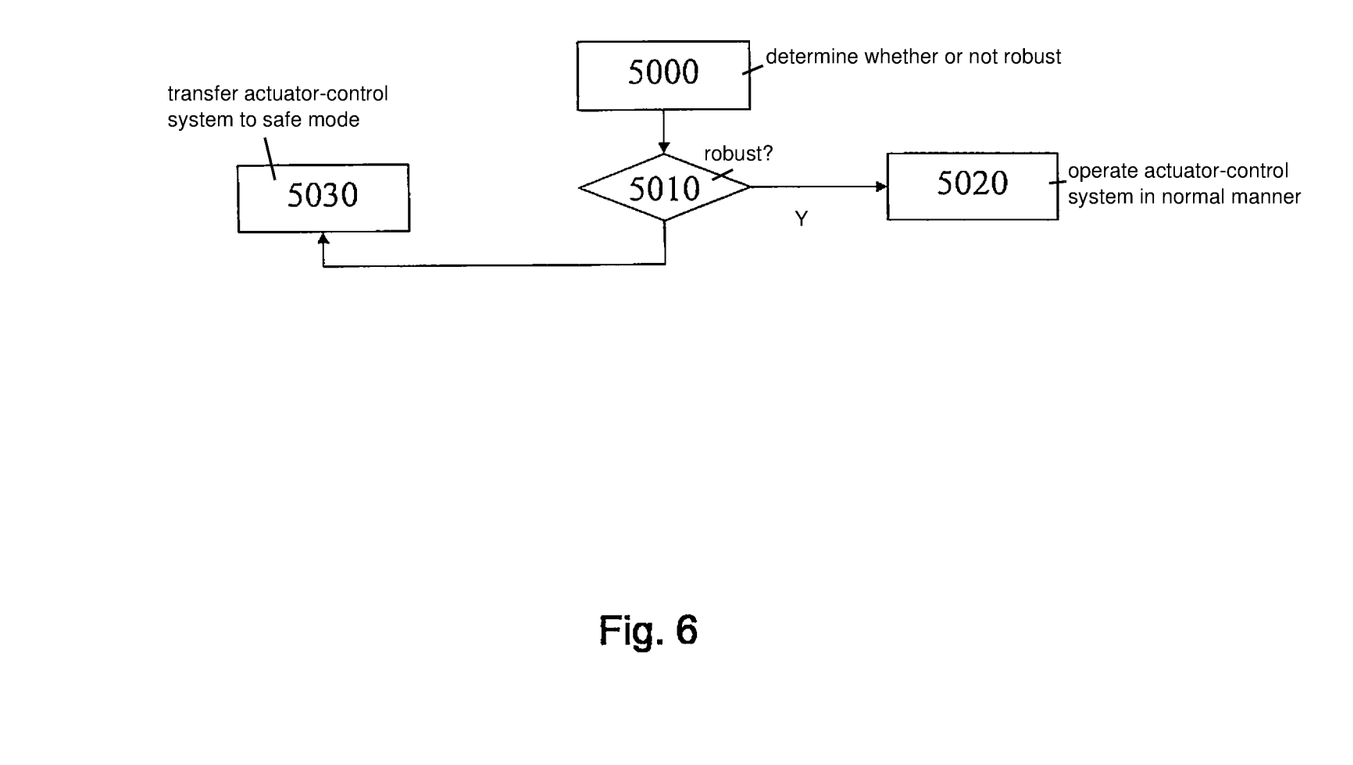
FIG. 6 shows a specific embodiment of the present method for operating the actuator-control system.

FIG. 6 shows an exemplary embodiment of the present method for operating the actuator-control system in the form of a flow diagram. In a first step 5000, using the method illustrated in FIG. 5, it is ascertained whether or not actuator-control system 40 is robust. In step 5010, it is then checked whether a decision was made that actuator-control system 40 is robust. If this is the case (5020), actuator-control system 40 is operated in a normal manner, and actuator 10 is controlled normally. If this is not the case (5030), actuator-control system 40 is transferred into a safe mode, for instance in that it can be provided that an absolute amount of control signal A is restricted to values below a criticality limit. This concludes the present method. The present method may be implemented as a computer program, be stored on the memory medium of actuator-control system 40, or be executed thereby.

What is claimed is:

1. A method for assessing a robustness of a machine learning system, which is designed to ascertain a semantic segmentation of a received one-dimensional or multi-dimensional data signal, in particular from a sensor, the method comprising:
    receiving, by a processor, a one-dimensional or multi-dimensional data signal from a sensor;
    ascertaining, by the processor, a manipulated data signal as a function of the received data signal, including a) ascertaining a desired semantic segmentation of the manipulated data signal, and b) generating the manipulated data signal as a function of the received data signal, the ascertained desired semantic segmentation, and an estimated semantic segmentation of the manipulated data signal;
    ascertaining, by the processor, depending on the received data signal and the manipulated data signal, whether or not the machine learning system is robust with respect to adversarial examples;
    wherein the generation of manipulated data signals takes place as a function of a function value of a weighted cost function of the machine learning system which the cost function assumes for the manipulated data signal and for the desired semantic segmentation.

2. The method as recited in claim 1, wherein the step of ascertaining whether or not the machine learning system is robust includes ascertaining a difference between the received data signal and the manipulated data signal and subsequently checking whether or not an amount of the difference exceeds a predefined limit value.

3. The method as recited in claim 1, wherein the machine learning system is a neural network.

4. A method for training a machine learning system, which is designed to ascertain a semantic segmentation of a received one-dimensional or multi-dimensional data signal, in particular from a sensor, the method comprising:
    a) selecting a subset of data signals from a training set for the machine learning system that includes data signals;
    b) for each data signal of the subset, deciding whether or not the data signal of the subset is to be manipulated;
    c) for each respective data signal of the subset for which it is decided in step b) is to be manipulated: ascertaining a respective manipulated data signal, the ascertaining including i) ascertaining a desired semantic segmentation of the respective manipulated data signal, and ii) generating the respective manipulated signal as a function of the respective data signal, the ascertained desired semantic segmentation, and an estimated semantic segmentation of the manipulated data signal, and substituting the ascertained manipulated data signal for the respective data signal;
d) for each respective data signal of the subset for which it is decided in step b) is not to be manipulated, setting a respective desired output value to a value of a predefinable first numerical value, and for each respective data signal of the subset for which it decided in step b) is to be manipulated, setting the value of the respective desired output value to a second predefinable numerical value that differs from the predefinable first numerical value; and
e) training parameters of the machine learning system using the ascertained manipulated data signals, the respective data signal of the subset for which it is decided in step b) is not to be manipulated, and the respective desired output values.

5. The method as recited in claim 4, wherein the machine learning system is a neural network.

6. A method for generating a manipulated data signal for misleading a first machine learning system, which is designed to ascertain a semantic segmentation of a received one-dimensional or multi-dimensional data signal, the method comprising:
a) receiving, by a processor, a one-dimensional or multi-dimensional data signal from a sensor;
b) ascertaining, by the processor, a desired semantic segmentation of the manipulated data signal; and
c) generating, by the processor, the manipulated data signal as a function of the received data signal, the ascertained desired semantic segmentation, and an estimated semantic segmentation of the manipulated data signal;
wherein the desired semantic segmentation is selected as a function of the estimated semantic segmentation of the received data signal;
wherein desired semantic values of the desired semantic segmentation are selected as a function of whether estimated semantic values of the estimated semantic segmentation assume a predefinable value;
wherein a substitute value is substituted for the desired semantic values at a position at which the estimated semantic values assume the predefinable value.

7. The method as recited in claim 6, wherein the substitute value is the estimated semantic value of a substitute position close to the position.

8. The method as recited in claim 6, wherein the generation of manipulated data signals takes place as a function of a function value of a weighted cost function of the first machine learning system which the cost function assumes for the manipulated data signal and for the desired semantic segmentation.

9. The method as recited in claim 7, wherein the desired semantic values are selected so as to equal the estimated semantic values when the estimated semantic values do not assume the predefinable value.

10. The method as recited in claim 8, wherein each of the ascertained manipulated data signal is selected from a quantity of allowed data signals in such a way that it numerically minimizes the cost function for the desired semantic values.

11. The method as recited in claim 10, wherein the cost function encompasses two components, one of the two components characterizes a share of positions in the cost function whose estimated semantic values assume the predefinable value, and the other of the two components characterizes a share of the positions in the cost function whose estimated semantic values do not assume the predefinable value, and the two components are weighted relative to each other in a predefinable manner.

12. A method for generating a manipulated data signal for misleading a first machine learning system, which is designed to ascertain a semantic segmentation of a received one-dimensional or multi-dimensional data signal, the method comprising:
a) receiving, by a processor, a one-dimensional or multi-dimensional data signal from a sensor;
b) ascertaining, by the processor, a desired semantic segmentation of the manipulated data signal; and
c) generating, by the processor, the manipulated data signal as a function of the received data signal, the ascertained desired semantic segmentation, and an estimated semantic segmentation of the manipulated data signal;
wherein the received data signal includes a sequence of time slices, and the desired semantic segmentation of the received data signal of a predefinable time slice is selected as a function of an estimated semantic segmentation of the received data signal of a further time slice, and the further time slice lies temporally before the predefinable time slice.

13. The method as recited in claim 12, wherein the further time slice is fixedly selected, and for each predefinable time slice that lies temporally after the further time slice, the desired semantic segmentation of the data signal is selected so as to equal the estimated semantic segmentation of the received data signal of the further time slice.

* * * * *